(12) United States Patent
Fiore

(10) Patent No.: US 7,804,445 B1
(45) Date of Patent: Sep. 28, 2010

(54) METHOD AND APPARATUS FOR DETERMINATION OF RANGE AND DIRECTION FOR A MULTIPLE TONE PHASED ARRAY RADAR IN A MULTIPATH ENVIRONMENT

(75) Inventor: Paul D. Fiore, Chelmsford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 429 days.

(21) Appl. No.: 11/366,141

(22) Filed: Mar. 2, 2006

(51) Int. Cl.
*G01S 13/42* (2006.01)
(52) U.S. Cl. .......... 342/90; 342/146; 342/192; 342/196
(58) Field of Classification Search .......... 342/90
See application file for complete search history.

(56) References Cited

U.S. PATENT DOCUMENTS

| | | | | |
|---|---|---|---|---|
| 4,524,358 A * | 6/1985 | Bergman et al. | | 342/162 |
| 5,262,789 A * | 11/1993 | Silverstein | | 342/368 |
| 5,402,129 A | 3/1995 | Gellner et al. | | |
| 6,469,657 B1 * | 10/2002 | Fox | | 342/147 |
| 6,774,837 B2 * | 8/2004 | Barrick et al. | | 342/26 R |
| 6,856,281 B2 * | 2/2005 | Billington et al. | | 342/174 |
| 6,989,789 B2 * | 1/2006 | Ferreol et al. | | 342/440 |
| 2003/0140771 A1 * | 7/2003 | Ohshima | | 84/622 |
| 2004/0054528 A1 * | 3/2004 | Hoya et al. | | 704/211 |
| 2004/0175006 A1 * | 9/2004 | Kim et al. | | 381/92 |
| 2004/0178951 A1 * | 9/2004 | Ponsford et al. | | 342/192 |
| 2006/0066474 A1 * | 3/2006 | Shirakawa | | 342/147 |
| 2006/0071847 A1 | 4/2006 | Fiore | | |

OTHER PUBLICATIONS

Schmidt, Ralph O. "Multiple Emitter Location and Signal Parameter Estimation". IEEE Transactions on Antennas and Propagation. vol. 34, Issue 3. Mar. 1986. pp. 276-280.*
U.S. Appl. No. 10/956,643, filed Oct. 1, 2004, Fiore.

\* cited by examiner

*Primary Examiner*—Thomas H Tarcza
*Assistant Examiner*—Matthew M Barker
(74) *Attorney, Agent, or Firm*—Daniel J. Long; Bingham McCutchen LLP; Robert C. Bertin

(57) ABSTRACT

A system and method combine multiple data streams in an efficient and optimal manner, based on new techniques, to determine range, relative angle and velocity with respect to a point of reference. Embodiments of the present invention take advantage of the multiple data streams to provide improved performance when the data is contaminated with environmental and system noise. Embodiments of the present invention may be applied to data output from different target estimation systems, including radar, sonar, ultrasonic and laser systems. In addition, embodiments of the present invention may be implemented in systems with multiple tones and multiple antennas, and generally work in multipath environments.

13 Claims, 2 Drawing Sheets

METHOD AND APPARATUS FOR DETERMINATION OF RANGE AND DIRECTION FOR A MULTIPLE TONE PHASED ARRAY RADAR IN A MULTIPATH ENVIRONMENT

FIELD OF THE INVENTION

The present invention relates generally to range estimation and, more particularly, to the use of a multi-tone radar system to estimate range information pertaining to a target, including relative angle, range and velocity.

BACKGROUND OF THE INVENTION

Radar systems have conventionally been used to detect objects for various purposes. Radar systems have been applied to commercial and military aviation and in other vehicular systems. Radar systems have also been used in military systems and have been proposed for use in collision avoidance systems for passenger automobiles.

One type of radar system, a two-tone continuous wave radar system, is described in U.S. Pat. No. 5,402,129 by Robert C. Gellner et al. This patent describes a vehicular tracking system that uses a dual lobe, monopulse antenna to transmit a narrow beam radar signal at a vehicle. The reflected signal is received by the two lobes and both a sum signal and a difference signal are generated. The sum and difference signals are then processed to determine the angle of a target relative to the received signal.

Another type of radar system is described in patent applications entitled "Method and Apparatus For Correcting Velocity-Induced Range Estimate Phase Errors in a Two-Tone Monopulse CW Radar," by Paul Fiore and Eric Rundquist, filed on Oct. 1, 2004, and assigned Ser. No. 10/956,837; and "Method and Apparatus For Improved Determination of Range and Angle of Arrival Utilizing a Two-Tone CW Radar," by Paul Fiore, filed on Oct. 1, 2004, and assigned Ser. No. 10/956,643. These applications describe the use of a two-tone, continuous wave radar system for use in tracking rocket propelled grenades (RPGs). These radar systems also use sum and difference signals to determine an angle of the target relative to a reference direction.

In general, radar designs vary widely, ranging from low-cost continuous-wave (CW) systems, to high performance, pulse-Doppler and synthetic aperture approaches. For a radar to measure range, it is typically thought that some form of amplitude or phase modulation of the carrier is required. However, there is a method using more than one CW signal that can in fact provide range. A device known as a "tellurometer" is available for geodetic survey work, and makes use of the fact that the survey equipment is not moving (i.e. zero Doppler shift).

Radar designs also are used for the case where a target is expected to have a velocity. The utilization of multiple CW transmitted signals can produce the estimates of range, and to distinguish whether a target is approaching or receding. Another measurement that radars are often required to make is that of the two-dimensional (azimuth/elevation) direction of arrival (DOA) of the target. A basic approach is to use multiple antennas in a phased-array configuration for this determination. When multiple tone/multiple channel radar systems are implemented, a plurality of data streams are produced. In prior radar systems, the calculation of range and DOA are performed as separate, independent functions.

There remains a need, however, for a system to quickly and accurately determine the range, relative angle and velocity of a target from a point of reference. There is a further need for such a technique to be implemented relatively cost effectively, and in an environment where the data may be "noisy."

SUMMARY OF THE INVENTION

According the present invention, a system and method combine multiple data streams in an efficient and optimal manner, based on new techniques, to determine range, relative angle and velocity with respect to a point of reference. Embodiments of the present invention take advantage of the multiple data streams to provide improved performance when the data is contaminated with environmental and system noise. Embodiments of the present invention may be applied to data output from different target estimation systems, including radar, sonar, ultrasonic and laser systems. In addition, embodiments of the present invention may be implemented in systems with multiple tones and multiple antennas, and generally work in multipath environments. In addition, according to the present invention, correction of phase differences may be performed by a new, generally applicable technique that is well suited to multiple frequencies.

According to one embodiment of the invention, a method for determining range and angle of arrival, includes receiving reflected signals at multiple frequencies by multiple antennas, calculating a Fourier transform on the reflected signals, storing the Fourier transform results in an array for each frequency, each antenna and multiple bins. According to method, a peak bin is then determined and a range and angle of arrival calculated based on the identity of the peak bin and a MUSIC pseudospectrum for each of the range and angle of arrival. The stored values may undergo singular value decomposition prior to the MUSIC pseudospectrum. The antennas may comprise phased array antennas or other types of antennas having multiple antenna components. The range and angle of arrival may be output to a controller system, such as a weapon system, guidance system or other system that can make advantageous use of such data.

According to another embodiment of the present invention, a system for determining range and angle of arrival, comprises a transmitter, a receiving antenna and a signal processor. The transmitter is capable of transmitting multiple frequencies at a target. The receiving antenna comprises multiple antenna components that receive the transmitted signals after reflection off of a target. The signal processor calculates a Fourier transform on the reflected signals, storing the Fourier transform results in an array for each frequency, each and antenna and multiple bins, and determines the peak bin from among the stored data. The signal processor further calculates a range and angle of arrival based on the identity of the peak bin and MUSIC pseudospectrums for the range and angle of arrival.

BRIEF DESCRIPTION OF THE FIGURES

The above described features and advantages will be more fully appreciated with reference to the detailed description and appended figures, in which.

DETAILED DESCRIPTION

Figure 1:
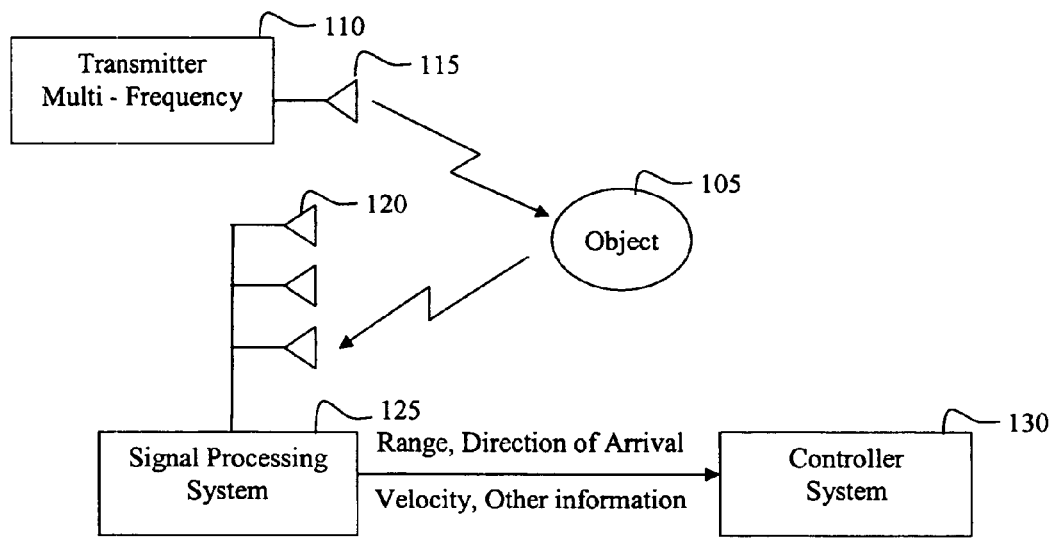
FIG. 1 depicts a system for determining range and angle of arrival information with respect to an object.

FIG. 1 depicts a system 100 for determining range and angle of arrival information with respect to an object 105. The system may further include a controller system 130 for taking actions in response to the determination of range and angle of arrival information with respect to an object or target 105.

Referring to FIG. 1, the system 100 includes a transmitter 110, transmitting antenna 115, receiving antennas 120, a signal processing system 125 and a controller system 130. The transmitting system 110 and antenna 115 transmit multiple frequency tones toward an object. The transmitting system 110 and antenna 115 may be, for example, part of a radar system capable of transmitting multiple frequency tones at an object. However, the transmitting system 110 and antenna 115 generally represent any system for transmitting multiple frequency signals at an object, including sonar, ultrasonic and laser transmitter systems.

The object 105 reflects the signals originating in the transmitting system toward receiving antennas 120. In general, the receiving antennas are capable of receiving multiple frequencies and may comprise, for example, a phased array antenna. The receiving antennas convey received signals to a signal processing system 125. The signal processing system 125 processes multiple frequency signals from the receiving antennas according to embodiments of the invention described below in order to determine an angle of arrival and range to a target or object. The range, angle of arrival and other information may then be output to a controller system 130 in order to act upon this information about the target. In general, the controller system may be a tracking system, a collision avoidance system, a guidance system, a weapon system or any other system capable of storing and/or using the range and angle of arrival information.

Figure 2:
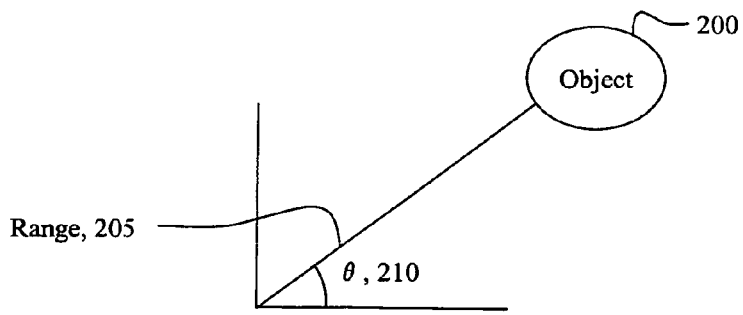
FIG. 2 depicts an object relative to reference directions illustrating range and angle of arrival measurements.

FIG. 2 depicts an object 200 in relation to a fixed point of reference. The object 200 has an angle of arrival θ, 210 relative to the fixed point of reference as shown in FIG. 2. In addition, the object has a range 205 relative to the fixed point of reference. The signal processing system shown in FIG. 1 determines these two values. In general, the object may be in motion and the signal processing system may determine and output the range and angle of arrival on a substantially continuous basis or at predetermined intervals. The object or target may be any type of object or target, and may be fast-moving, slow-moving or stationary. In addition, it will be understood that the point of reference shown in FIG. 2 may be stationary or moving, for example, by virtue of its attachment to a moving vehicle.

Figure 3:
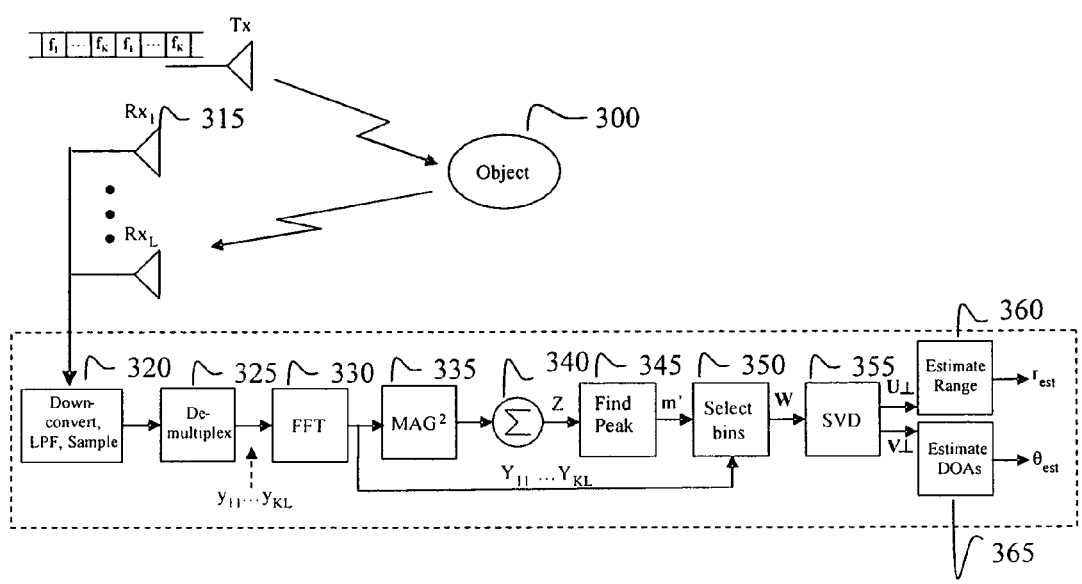
FIG. 3 depicts an illustrative system according to an embodiment of the present invention for determine range and angle of arrival.

FIG. 3 depicts an embodiment of the present invention implemented as a multiple frequency radar system. The system does not rely on sum and difference signals to estimate the range to a target or the angle of arrival of the target relative to a reference direction.

Referring FIG. 3, the system operates by transmitting a signal having multiple tones ($f_1$ to $f_K$) at an object using several (1 to K) multiplexed frequencies. The signals reflect off of the object 300 and are received by a phased array antenna having L antennas 315. The signals are then received at a down converter 320.

To further describe the signals, assume that the frequencies are designated $f_k$ for k=1, ..., K. This denotes each of the K frequencies used. Further assume that the $f_k$'s are close enough together that the wavelengths may be approximated by a known constant λ.

Let l=1, ..., L index the L channels of available data. For phased-array systems, the number of antennas is L, and each antenna supplies a corresponding channel of information. We further assume for simplicity that the L antennas are arranged in a uniform linear array spaced a distance d apart, with each antenna having the same beam pattern. It will be understood, however, that other antenna patterns may be implemented according to embodiments of the present invention.

Further assume that the multipath geometry is such that S paths reach the L receivers, and that the path lengths are close to each other such that they can be modeled as being all equal (to twice the range). Also assume that signals are modeled as arriving from the far-field, from angles of arrival denoted by $\theta_1, \ldots \theta_S$.

For all channels l=1, ..., L and for all frequencies k= 1, ..., K, let the time domain data samples be represented by $y_{kl}(n)$, n=1, ..., N. The data stream for each frequency/channel combination is transformed via a conventional windowed FFT $$Y_{kl}(m) = \sum_{n=0}^{N-1} w(n) y_{kl}(n) e^{-j2\pi mn/N},$$

$$k = 1, \ldots, K, \quad l = 1, \ldots, L, \quad m = 0, \ldots, N-1,$$

where w(n) is a window function. Alternatively, using well-known methods, a heavily zero-padded FFT may be used to give refined results in the processing to follow. Additionally, other well-known interpolation methods can be employed to further refine the results in the processing described below.

Once the signals are received by the antennas 315, the down converter 320 generally down converts the signals, runs the signals through a low pass filter and samples the signals in the time domain. In any event, block 320 down converts and outputs a sampled signal. The sampled signals are further de-multiplexed in a de-multiplexer 325, which generates $y_{11} \ldots y_{KL}$. For all channels l=1 to L and all frequencies k=1 to K, the time domain samples are represented by $y_{kl}(n)$ where n=1 to N. The demultiplexed signals are then converted into the frequency domain in a fast Fourier transform block 330. The output of the Fourier transform is a three dimensional matrix of signals $Y_{11}$ to $Y_{KL}$ in the frequency domain, with N bins associated with each frequency (1 to K) and antenna (1 to L). The signals are stored in a memory as an array of values. The memory may be any type of storage device.

The values $Y_{11}$ to $Y_{KL}$ are provided to a magnitude squared block 335 and to a select bins block 350. The magnitude squared block 325 squares the values, which are used to facilitate a determination of the peak bin from among the N bins for each frequency and antenna. After the magnitude squared block, there a summation block that sums the values according to the following the equation:

$$Z(m) = \sum_{k=1}^{K} \sum_{l=1}^{L} |Y_{kl}(m)|^2, \quad m = 0, \ldots, N-1.$$

The values Z(m) are output to a find peak block 345. The find peak block 345 determines the peak bin m'. The peak bin m' of Z, such that Z(m')≧Z(m) is determined via a simple peak search. As is well known, the peak search is generally performed only over frequency regions where target returns can occur (as determined by system design and target dynamics). Note that it is assumed here that the Doppler frequencies, given by $2\omega_k v/c$, are all contained within a single FFT bin. For the foregoing equation, v=the target radial velocity and c=the speed of light. This is generally true because the carrier frequencies $f_k = \omega_k / 2\Pi$ are usually many orders of magnitude greater than the sampling rate in radar systems. Optionally, a refined peak may be calculated and used in the processing to follow. There are many well known methods to calculate refined peaks, such as a parabolic interpolation approach.

Once the peak search is performed, bin m' of each of the original FFTs, $Y_{kl}(m')$, are arranged into K×P matrices Wq for q=1, . . . , Q, where Q=L−P+1 and where P>S and S is the number of multipath components. For example, for the RPG problem with a direct path and a single ground bounce, we have S=2, and one possibility is to let P=3 and L=4 (and hence Q=2).

The peak bin (m') may then be used by the select bins block 350 to select the demultiplexed values associated with the peak bin, namely $Y_{11}(m')$, . . . , $Y_{KL}(m')$ of the original FFTs. $Y_{kl}(m')$, are arranged into K×P matrices $W_q$ for q=1, . . . , Q, where Q=L−P+1 and where P>S and S is the number of multipath components. For example, for the RPG problem with a direct path and a single ground bounce, we have S=2, and one possibility is to let P=3 and L=4 (and hence Q=2). These values are used to construct the matrices $W_q$ and the matrix W based on the below equations:

$$w_q = [y_q \ \ldots \ y_{q+P-1}], \quad y_i = \begin{bmatrix} Y_{i,1}(m') \\ \vdots \\ Y_{i,K}(m') \end{bmatrix}, \quad W = \begin{bmatrix} W_1 \\ \vdots \\ W_Q \end{bmatrix}.$$

The SVD block 355 calculates left and right singular vector matrices U⊥ and V⊥ corresponding to the noise subspace of W. These matrices may be calculated using Singular Value Decomposition (SVD). The SVD decomposes W as $W = U\Sigma V^H$, where U is KQ×KQ, E is KQ×P, V is P×P, and $(\bullet)^H$ stands for Hermitian transpose. The matrix W identified above is output to the Singular Value Decomposition (SVD) block 355. The matrix Σ is diagonal, with positive real values on the diagonal. The values on the diagonal are assumed sorted into non-increasing order, with the largest value in the upper left corner. The matrix of left singular vectors corresponding to the minimum (K−1)Q singular values, denoted by U⊥, is next extracted from U, by taking U⊥ as the last (K−1)Q columns of U. From U⊥, the range r is now estimated. MUSIC (or a related algorithm), is performed on U⊥, thereby giving an estimate for r.

Finally the range and direction of arrival are estimated in blocks 360 and 365 from U⊥ and V⊥ using an algorithm such as MUSIC, where the estimated range and direction of arrival are those that are determined to maximize the below equations.

For range (r), U⊥ is provided to an estimate range block 360:

$$P_{MUSIC}(r) = \frac{1}{\|U_\perp^H G_r\|_F^2}$$

In the above equation, $$G_r \triangleq \begin{bmatrix} g_r & & \\ & \ddots & \\ & & g_r \end{bmatrix}.$$

and $$g_r \triangleq \begin{bmatrix} 1 & & & \\ & e^{j2\omega_2 vT/c} & & \\ & & \ddots & \\ & & & e^{j2\omega_K v(K-1)T/c} \end{bmatrix} \begin{bmatrix} e^{-j2\omega_1 r/c} \\ \vdots \\ e^{-j2\omega_K r/c} \end{bmatrix}$$

The diagonal matrix implements the phase correction required for a target moving at velocity v, with T seconds between adjacent frequency samples. The terms $2\omega_k vT/c$ may be replaced by Πm'/N. $\|\bullet\|_F$ denotes the Frobenius norm, the MUSIC pseudospectrum. The range r is determined by the value for which $P_{MUSIC}(r)$ is maximized.

For angle of arrival (θ), the matrix of right singular vectors corresponding to the minimum P-S singular values, denoted by V⊥, is next extracted from V, by taking V⊥ as the last P-S columns of V. MUSIC (or a related algorithm) is performed on the matrix V⊥, thereby giving an estimate for the angles of arrival. An illustration of one such technique that scans over θ is now given. θ is selected as one of the $\theta_1 \ldots \theta_s$ according to reasonable criteria for target location and dynamics. For example, in the RPG location problem, choose theta as the largest of $\theta_1 \ldots \theta_s$ since the other theta's correspond to ground bounce multipaths. For a particular θ, let $$a(\theta) \triangleq \begin{bmatrix} 1 \\ e^{-j2\pi d \sin\theta/\lambda} \\ \vdots \\ e^{-j2\pi(P-1)d\sin\theta/\lambda} \end{bmatrix}.$$

The MUSIC pseudospectrum $$P_{MUSIC}(\theta) = \frac{1}{a^*(\theta)^H V \perp V_\perp^H a^*(\theta)}$$

(where "*" stands for the complex conjugate) is evaluated, and those values of θ corresponding to the local peaks of $P_{MUSIC}(\theta)$ are chosen as the estimated DOAs $\theta_1, \ldots, \theta_s$. In this manner, the angle of arrival θ is determined.

While particular embodiments of the present invention have been shown and describe, it will be understood by those having ordinary skill in the art that changes may be made to those embodiments without departing from the spirit and scope of the present invention. For example, in this case, each of the blocks shown in FIG. 3 may be combined into one or more larger functional blocks. Conversely, some of the blocks may be separated into distinct functional blocks. In addition, it will be understood that the blocks of FIG. 3 may be implemented in hardware, firmware or computer software running on a general purpose computer, a processor, a digital signal processor, an application specific integrated circuit or any similar device. The program instructions for any such device may be stored on any media that is capable of storage and retrieval and may instruct a device or computer to perform the processing described herein. It will be further understood that while particular peak detection and other algorithms have been described, changes may be made to those algorithms and indeed different algorithms may be implemented or substituted, for example, to determine the peak bins.

What is claimed is:

1. A method for determining range and angle of arrival, comprising:
   receiving reflected signals from a target at multiple frequencies by multiple antennas;
   calculating a Fourier transform on the reflected signals;
   storing in memory the Fourier transform results in an array of bins associated with each frequency and antenna;
   determining the peak bin; and
   calculating a range and angle of arrival with reference to the target based on the identity of the peak bin and a MUSIC pseudospectrum.

2. The method according to claim 1, wherein the multiple antennas are phased array antennas.

3. The method according to claim 1, wherein the signals are RADAR signals.

4. The method according to claim 1, wherein the MUSIC pseudospectrum used to determine the range is:

$$P_{MUSIC}(r) = \frac{1}{\|U_\perp^H G_r\|_F^2}.$$

5. The method according to claim 4, wherein the range r is determined by maximizing the value of $P_{MUSIC}(r)$.

6. The method according to claim 1, wherein the MUSIC pseudospectrum used to determine the angle of arrival is:

$$P_{MUSIC}(\theta) = \frac{1}{a^*(\theta)^H V_\perp V_\perp^H a^*(\theta)}.$$

7. The method according to claim 6, wherein angle $\theta$ is determined by maximizing the value of $P_{MUSIC}(\theta)$.

8. The method according to claim 1, further comprising outputting the calculated range and angle of arrival to a controller system.

9. The method according to claim 1, further comprising performing singular value decomposition on the stored values.

10. A system for determining range and angle of arrival, comprising:
    a transmitter capable of transmitting multiple frequencies at a target;
    a receiving antenna comprising multiple antenna components that receives transmitted signals reflected off of a target; and
    a signal processor, the signal processor calculating a Fourier transform on the reflected signals, storing in memory the Fourier transform results in an array of bins associated with each frequency and antenna, determining the peak bin and calculating a range and angle of arrival with reference to the target based on the identity of the peak bin and a MUSIC pseudospectrum.

11. The system according to claim 10, wherein the multiple antennas are phased array antennas.

12. The system according to claim 10, wherein the signals are RADAR signals.

13. The method according to claim 10, further comprising performing singular value decomposition on the stored values.

* * * * *